United States Patent
Chen

(10) Patent No.: US 10,769,793 B2
(45) Date of Patent: Sep. 8, 2020

(54) METHOD FOR PITCH ANGLE CALIBRATION BASED ON 2D BOUNDING BOX AND ITS 3D DISTANCE FOR AUTONOMOUS DRIVING VEHICLES (ADVS)

(71) Applicant: Baidu USA LLC, Sunnyvale, CA (US)

(72) Inventor: I-Kuei Chen, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 186 days.

(21) Appl. No.: 15/955,644

(22) Filed: Apr. 17, 2018

(65) Prior Publication Data
US 2019/0318481 A1    Oct. 17, 2019

(51) Int. Cl.
*G06T 7/12*    (2017.01)
*G05D 1/02*    (2020.01)
*B60W 40/11*   (2012.01)

(52) U.S. Cl.
CPC ............. *G06T 7/12* (2017.01); *B60W 40/11* (2013.01); *G05D 1/024* (2013.01); *G05D 1/0219* (2013.01); *G06T 2210/12* (2013.01)

(58) Field of Classification Search
CPC ..... B60W 40/11; G05D 1/0219; G05D 1/024; G06T 2210/12; G06T 7/12
See application file for complete search history.

(56) References Cited

U.S. PATENT DOCUMENTS

2018/0322648 A1* 11/2018 Lu ..................... G06T 7/85
2019/0310637 A1* 10/2019 Dean .................. G05D 1/0255

OTHER PUBLICATIONS

Pitch Angle Estimation Using a Vehicle-Mounted Monocular Camera for Range Measurement, Li, Bo, Zhang, Xiaolin, Sato, Makoto, Department of Information Processing, Tokyo Institute of Technology, 2014 IEEE, pp. 1161-1168.

* cited by examiner

*Primary Examiner* — Nirav G Patel
(74) *Attorney, Agent, or Firm* — Womble Bond Dickinson (US) LLP

(57) ABSTRACT

In one embodiment, a system of an ADV perceives an object in a perspective view of the ADV using a plurality of sensors mounted on the ADV including capturing an image of the object. The system determines a two-dimensional (2D) bounding box for the object and a perceived distance from the ADV to the object. The system searches, within an image space of the image, a dynamic pitch angle based on the 2D bounding box and the perceived distance from the ADV to the object by modifying at least a previous extrinsic calibration value to calculate a distance. The system determines a distance from the ADV to a point on a ground plane of the perspective view of the ADV based on the determined dynamic pitch angle. The system generates a driving trajectory based on the determined distance for the point on the ground plane to control the ADV.

21 Claims, 13 Drawing Sheets

METHOD FOR PITCH ANGLE CALIBRATION BASED ON 2D BOUNDING BOX AND ITS 3D DISTANCE FOR AUTONOMOUS DRIVING VEHICLES (ADVS)

TECHNICAL FIELD

Embodiments of the present disclosure relate generally to operating autonomous vehicles. More particularly, embodiments of the disclosure relate to methods for pitch angle calibration for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

A perception of a surrounding environment may represent what an ordinary driver would perceive surrounding a vehicle in which the driver is driving. Different sensory systems for an autonomous driving vehicle may have a limited perception. For example, perceptions based on camera images are missing depth information. Perceptions based on LIDAR and RADAR images may be limited to black and white. Moreover, accuracy of LIDAR and RADAR can be dependent on weather conditions and/or distances to perceived objects.

Range measurement can be calculated for any ground plane pixels (assuming a relatively flat ground plane) captured by camera images once calibration parameters (such as a dynamic change in pitch angle between the camera and the ground plane) of the camera capturing the images are known. However range measurements based on images captured by camera devices can be inaccurate due to a change in the pitch angle (e.g., the vehicle being tilted) of the ADV and/or camera devices while the ADV is in operation. Thus, there is a need to estimate a change in pitch angle of the ADV to improve an accuracy of range measurements for ground pixels using monocular cameras.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one embodiment, a system of an ADV perceives an object in a perspective view of the ADV using a plurality of sensors mounted on the ADV including capturing an image of the object using a monocular image capturing device. The system determines, based on the image, a two-dimensional (2D) bounding box for the object and a perceived distance from the ADV to the object. The system searches within the image space a dynamic pitch angle based on the 2D bounding box and the perceived distance from the ADV to the object by modifying at least a previous extrinsic calibration value to calculate a distance value. The system determines a distance from the ADV to a point on a ground plane of the perspective view of the ADV based on the determined dynamic pitch angle view. The system generates a driving trajectory based on the determined distance for the point on the ground plane to control the ADV.

Figure 1:
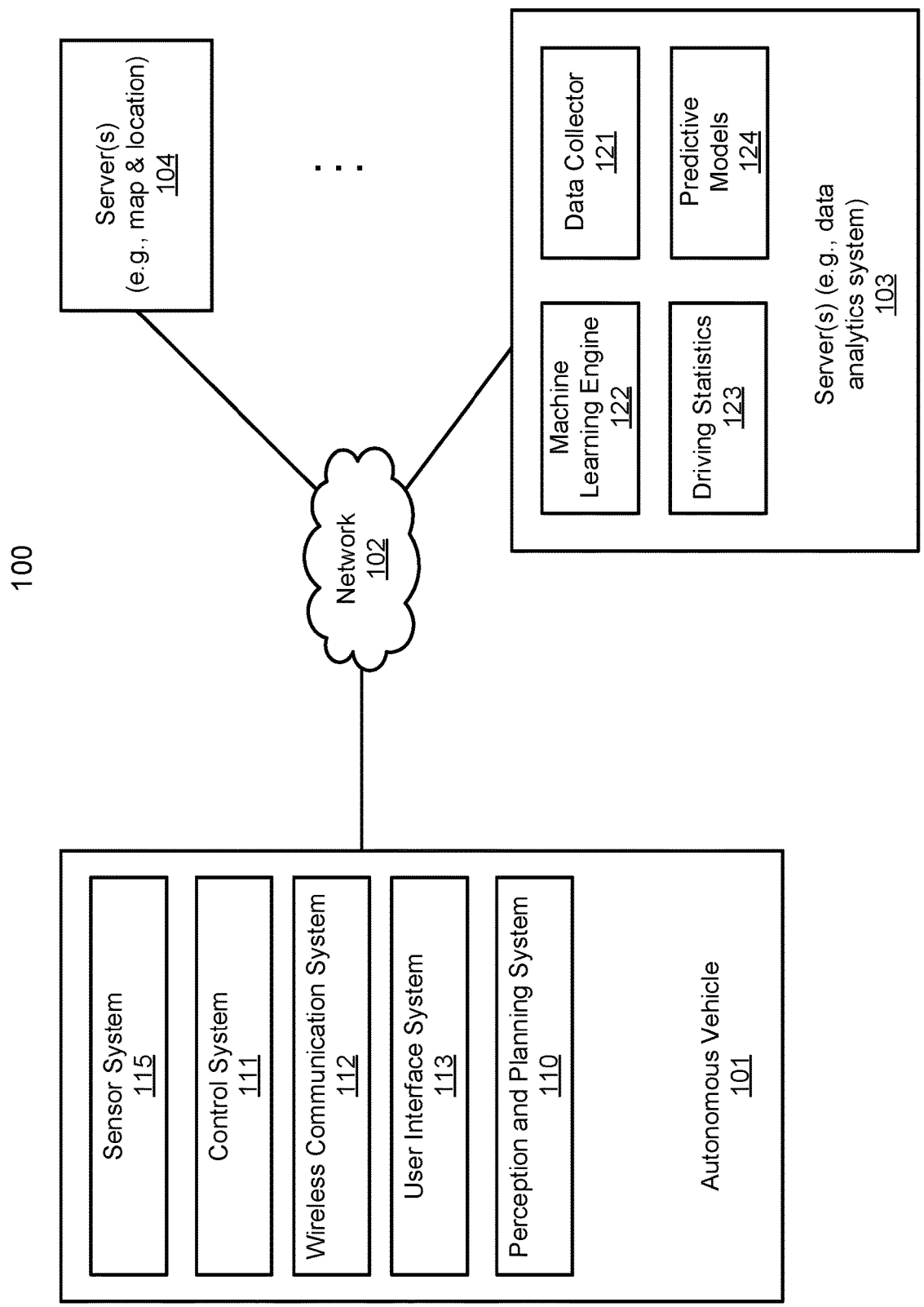
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
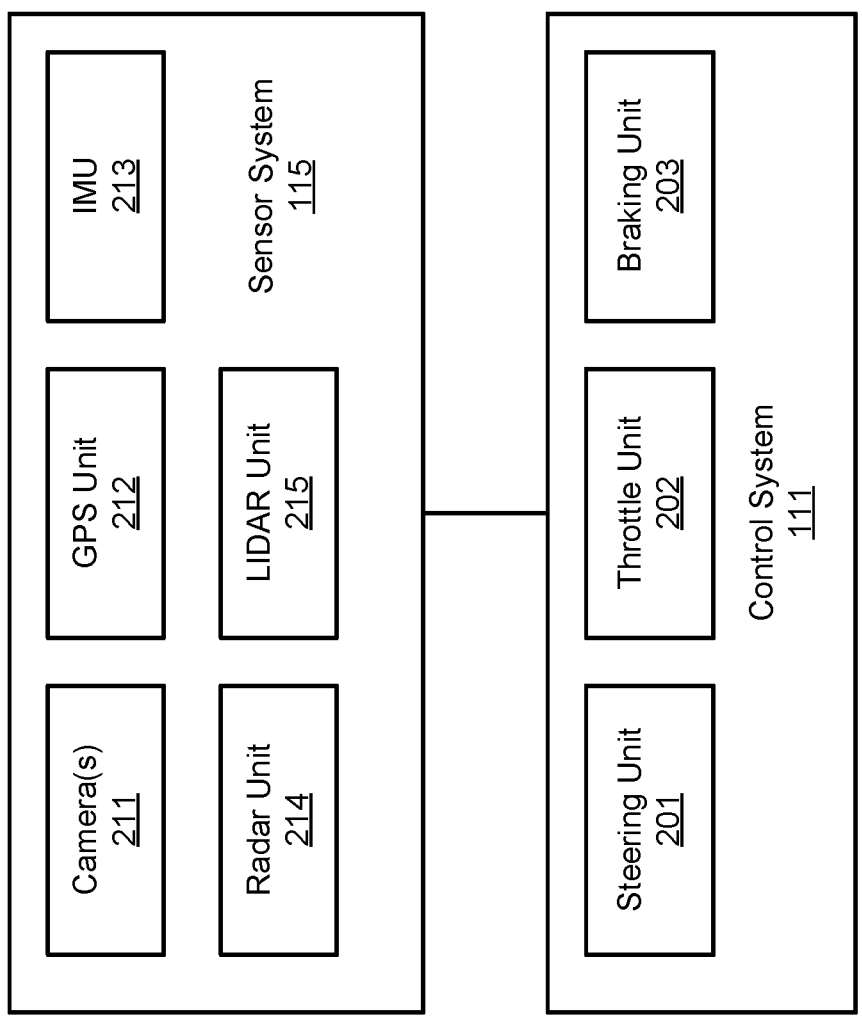
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, weather conditions, and road conditions, such as slow traffic on freeway, stopped traffic, car accident, road construction, temporary detour, unknown obstacles, etc.

Based on driving statistics 123, machine learning engine 122 generates or trains a set of rules, algorithms, and/or predictive models 124 for a variety of purposes, including models to render two dimensional (2D) bounding boxes on to objects identified in images captured by image capturing devices for the ADV.

Figure 3A:
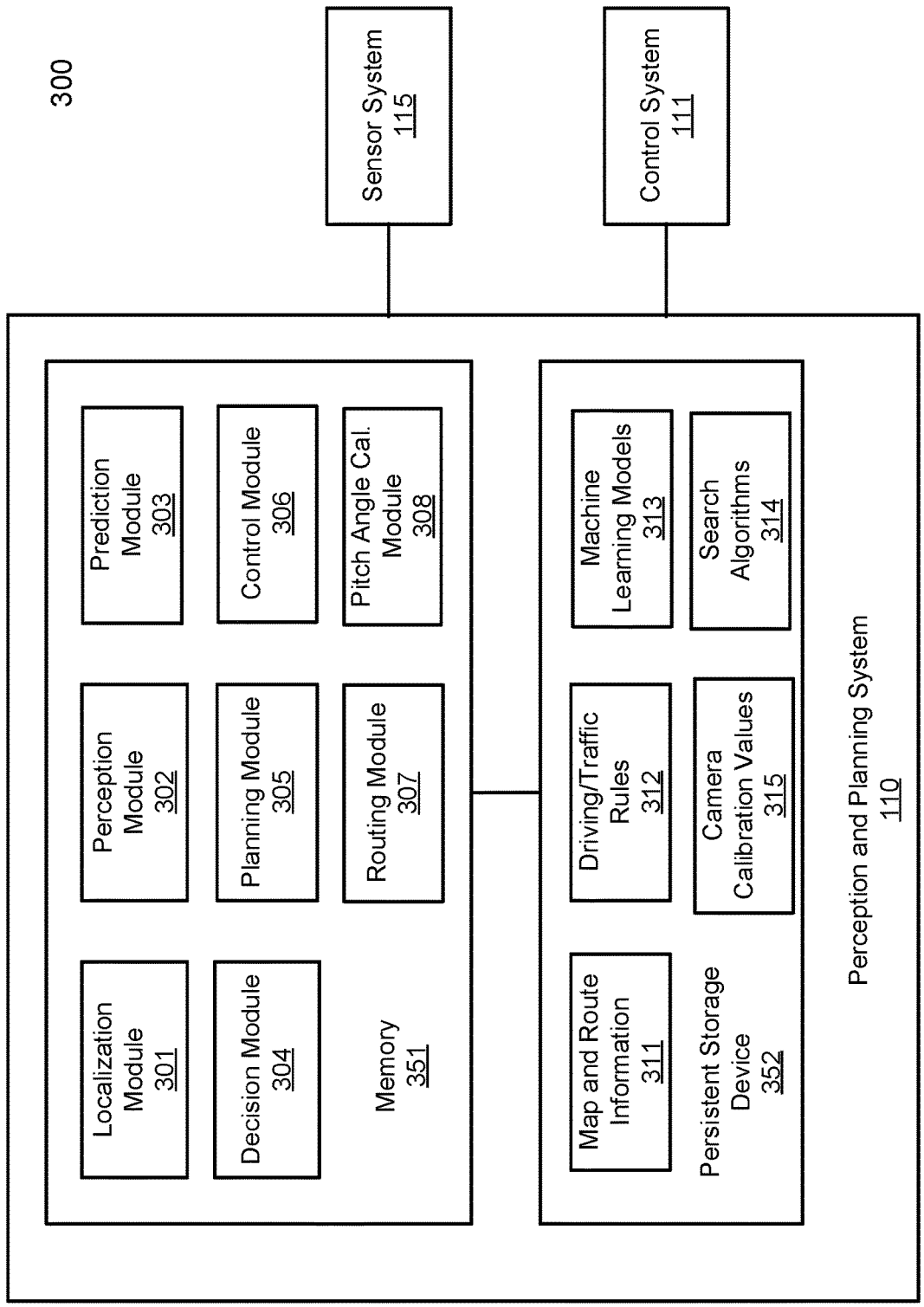
FIGS. 3A-3B are block diagrams illustrating an example of a perception and planning system used with an autonomous vehicle according to one embodiment.
Figure 3B:
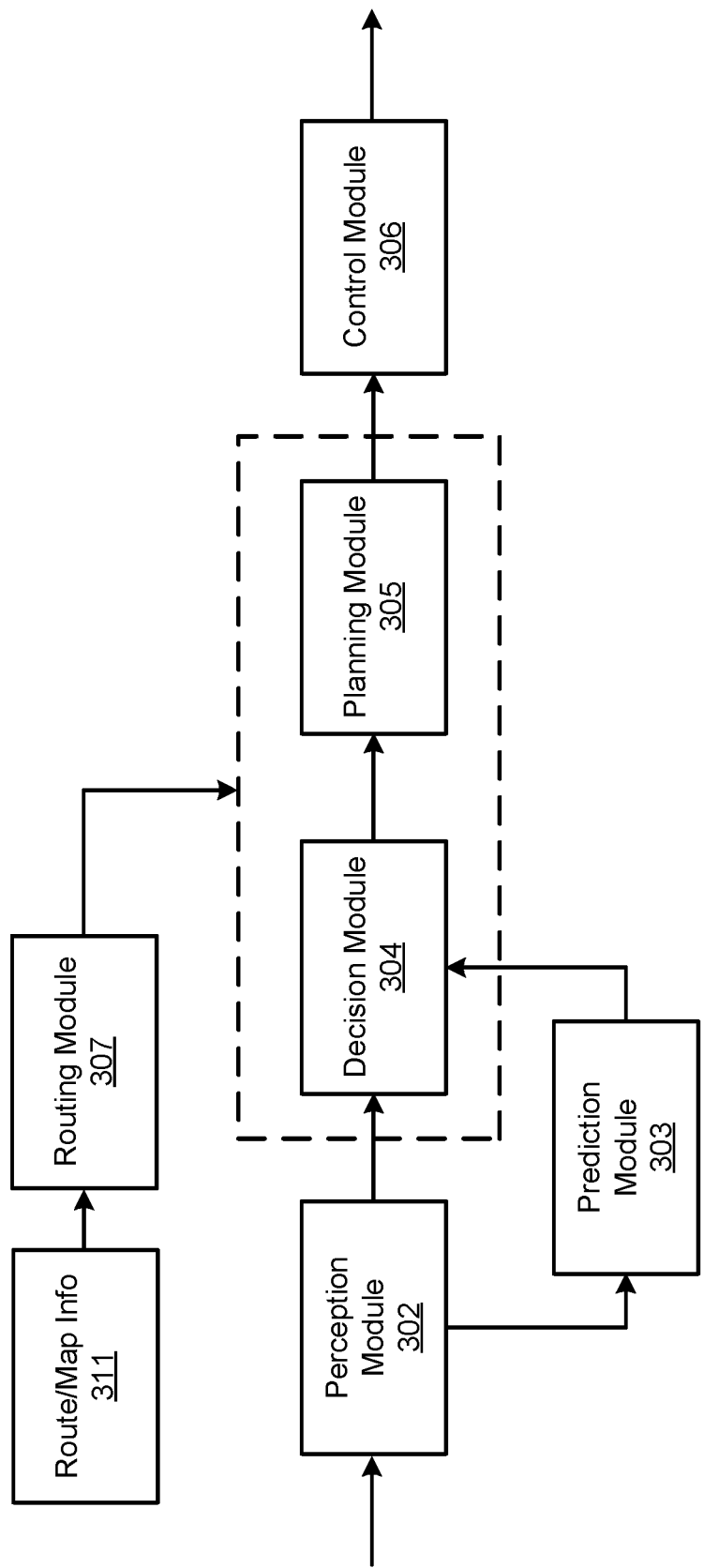

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and pitch angle calibration module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

The planning phase may be performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. For example, planning module 305 may plan a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, pitch angle calibration module 308 can perform an online calibration for a real-time pitch angle for the ADV/camera device based on a 2D bounding box (based on machine learning models 313) of a perceived object and a true distance to the perceived object. A pitch angle can be calibrated by adjusting external calibration parameters for the camera device (as part of camera calibration values 315) corresponding to the pitch angle to calculate a distance to the perceived object. The calculated distance can then be updated in view of the true distance to the perceived object using a search algorithm (as part of search algorithms 314) to search for the pitch angle. In one embodiment, pitch angle calibration module 308 can be integrated with perception module 302 as a single module or can be a separate module. In another embodiment, pitch angle calibration module 308 can be implemented as part of perception module 302.

Figure 4:
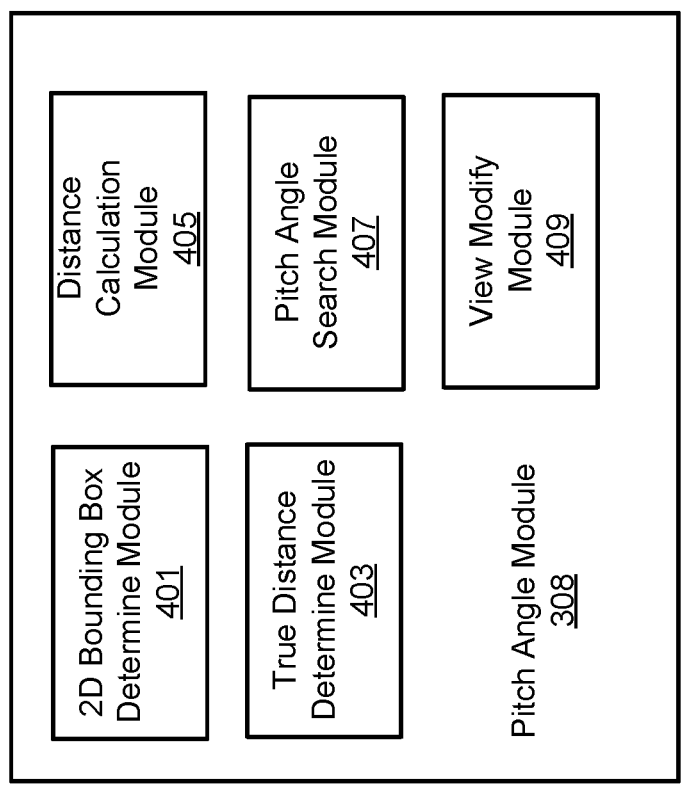
FIG. 4 is a block diagram illustrating an example of a pitch angle module according to one embodiment.

FIG. 4 is a block diagram illustrating an example of a pitch angle calibration module according to one embodiment. Referring to FIG. 4, pitch angle calibration module 308 can calibrate a pitch angle for the ADV and/or image capturing devices (such as cameras) installed on the ADV. Pitch angle calibration module 308 can include 2D bounding box determine module 401, true distance determine module 403, distance calculation module 405, pitch angle search module 407, and view modify module 409. 2D bounding box determine module 401 can select and/or determine a 2D bounding box for a perceived object for pitch angle calibration. True distance determine module 403 can determine a true distance to a perceived object. Distance calculation module 405 can calculate a distance from the ADV to the perceived object based on a searched pitch angle. Pitch angle search module 407 can search for a pitch angle to match a calculated distance to a true distance from the ADV to the object. View modify module 409 can modify a perceived view in an image plane of a captured image to account for any pitch angle calibrations to calculate an accurate range measurement (e . . . , distance from the ADV to the perceived object) for any pixels in the captured image.

Figure 5B:
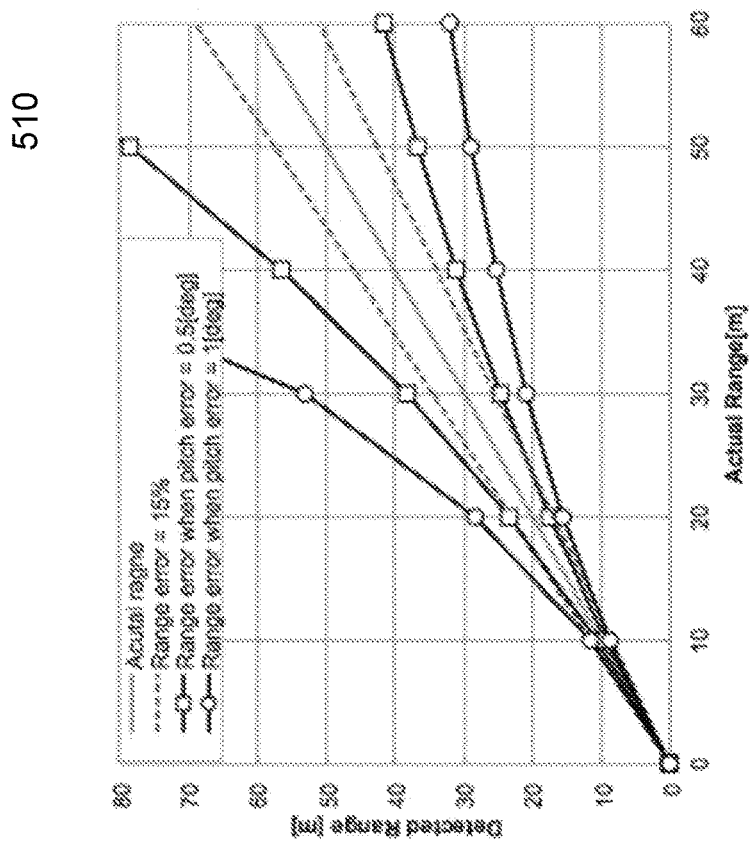
FIGS. 5A-5B are block diagrams illustrating examples of an ADV having a pitch angle and a chart for error rates in range measurements versus pitch angles respectively.
Figure 5A:
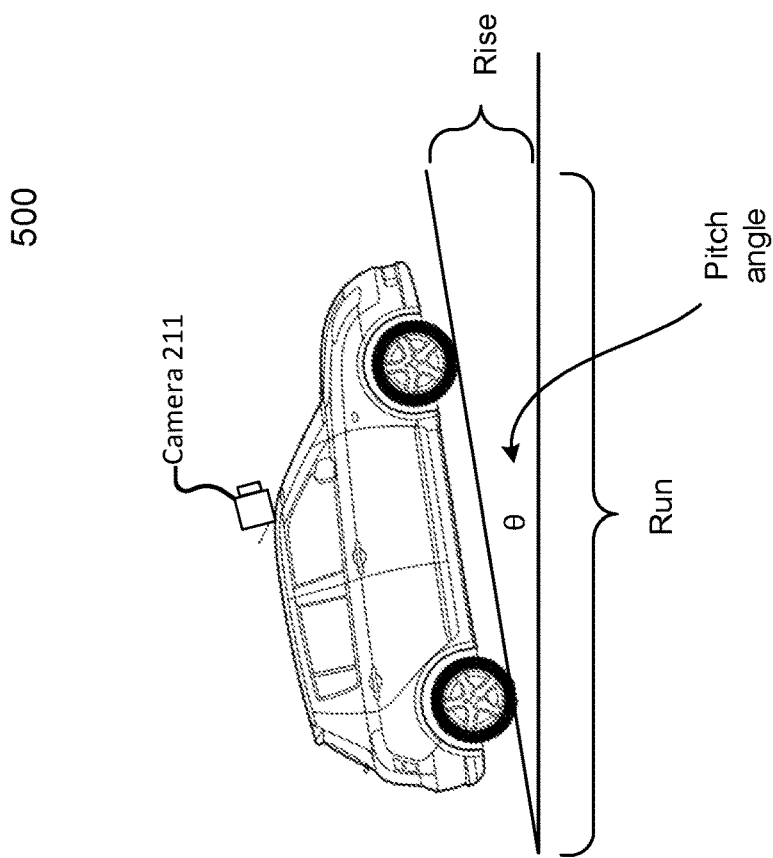

FIGS. 5A-5B are block diagrams illustrating examples of an ADV having a pitch angle and a chart for error rates in range measurements versus pitch angles respectively. Referring to FIG. 5A, ADV 101 can include one or more image capturing devices (e.g., camera 211). ADV 101 can be inclined at an angle (e.g., a pitch angle) with reference to a flat road surface where the pitch angle is equal to tan(rise/run) of ADV 101. In general, sources of dynamic pitch angle per image frame can include but is not limited to: suspension, acceleration, braking, a change in weight distribution in the ADV for passengers, and uneven roadway, etc. Referring to FIG. 5B, chart 510 illustrates error rates for range measurements versus pitch angles. A pitch angle in the magnitude of approximately 0.5 degrees can result in a range measurement error in the range of 15% for an obstacle approximately 20 meters away from ADV 101. As the distance from ADV 101 to a measured object increases, the range measurement error increases.

Figure 6A:
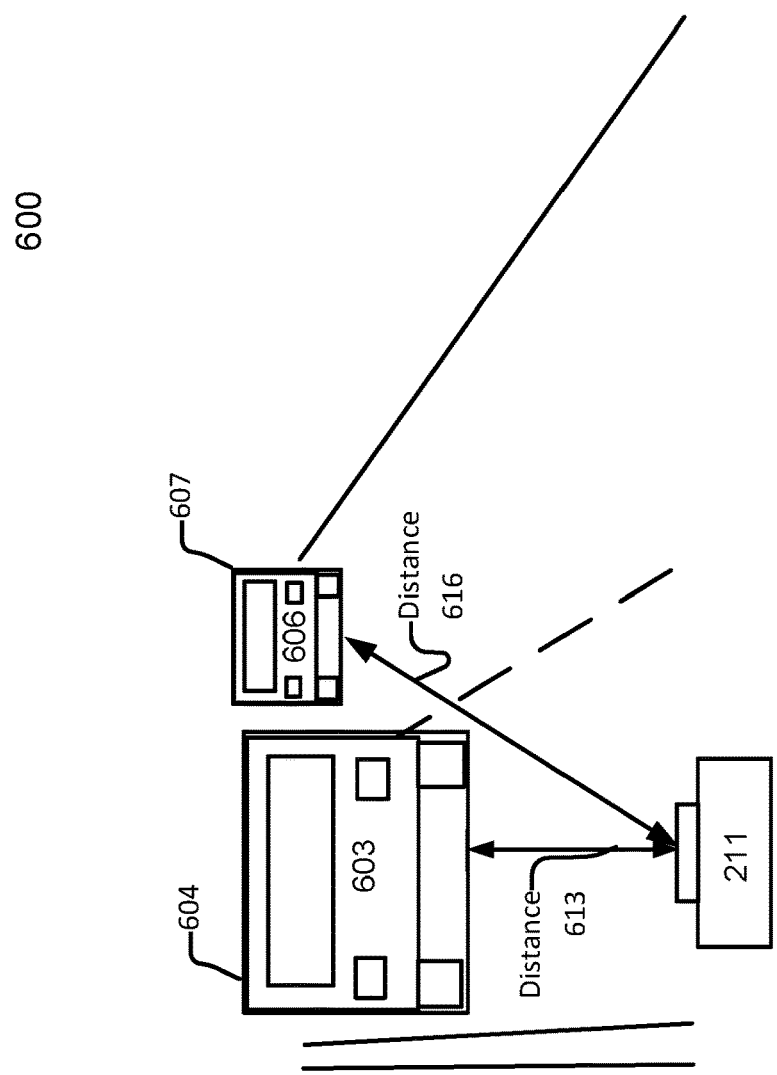
FIG. 6A is a block diagram illustrating an example of a perspective view for an ADV according to one embodiment.

FIG. 6A is a block diagram illustrating an example of a perspective view for an ADV according to one embodiment. Perspective view 600 can be a perspective view seen by ADV 101 (ADV 101 not shown in FIG. 6A) through camera 211. Perspective view 600 can correspond to an image (having an image plane) captured by camera 211. Referring to FIG. 6A, perspective view 600 includes road 601, and vehicles 603 and 606. Vehicles 603 and 606 can be detected as objects by perception module 302 of ADV 101. A 2D bounding box determine module, such as 2D bounding box determine module 401 of calibration module 408 of FIG. 4, can then apply a machine learning model (as part of machine learning models 313 of FIG. 3A) to superimpose 2D bounding boxes 604 and 607 on to vehicles 603 and 606. Various machine learning models can be used to calculate the 2D bounding boxes, including but not limited to, convolutional neural network, regional convolutional neural networks such as fast and faster regional convolutional neural networks, masked regional neural network, etc. In one embodiment, 2D bounding boxes 604 and 607 are tightened to fit the dimensions of the objects. For example, a linear regression can be applied for each region of objects 603 and 606 to generate tight bounding box coordinates for the region until a dimension (e.g., a length or a width) of the bounding box in comparison with its previous dimension reaches a predetermined threshold or until a certain number of iteration has elapsed.

For a tightly bounded 2D bounding box in a captured image, assuming the objects e.g., vehicle 604 and 607, are stationed on a ground plane, the bottom lattice of the 2D bounding box can be used as the ground point of contact. Based on the ground contact point, ADV 101 can estimate a distance from the ADV to the object based on extrinsic calibration parameters of camera 211, which may be previously calibrated. Camera 211 includes intrinsic and extrinsic calibration parameters. Intrinsic calibration parameters include a focal length, skew coefficients, and an image plane optical center. Extrinsic calibration parameters include rotation and translation of the camera with respect to a perceived object. Rotation parameters may include a yaw, a pitch angle, and a roll angle of the camera. Camera calibration can be performed using calibration tools from software such as OpenCV, Matlab, and robotics operating systems (ROS), based on some patterns on walls, ground, or a calibration target in a scene. Once intrinsic and/or extrinsic parameters of a camera are known, any real-world distance can be determined based on pixel distances from an image captured by camera 211.

Once 2D bounding boxes are applied to perceived objects, a 2D bounding box determine module, such as 2D bounding box determine module 401 of FIG. 4, can select a 2D bounding box to be used for pitch angle calibration. In one embodiment, module 401 selects the 2D bounding box based on a distance to the object. For example, bounding box 604 would be used instead of bounding box 607 because object 603 corresponding to bounding box 604 is closer to camera 211. A closer object would tend to have a higher accuracy for pitch angle calibration because vehicle 603 and thus bounding box 604 is represented by more pixels in the perspective view image.

Next, a true distance to the object corresponding to the 2D bounding box can be determined. In one embodiment, true distance determine module 403 determines the true distance to vehicle 603 using a SONAR, LIDAR, and/or RADAR depth image capturing vehicle 603. In another embodiment, true distance determine module 403 can determine the true distance using a machine learning algorithm to predict a distance to the object based on a size of the object in a captured RGB (red green and blue) image. In another embodiment, the true distance can be predetermined by one or more location sensors for ADV 101 and/or vehicle 603. Here, any combination of the above methods can be used to determine the true distance to vehicle 603 (e.g., distance 613).

Figure 6B:
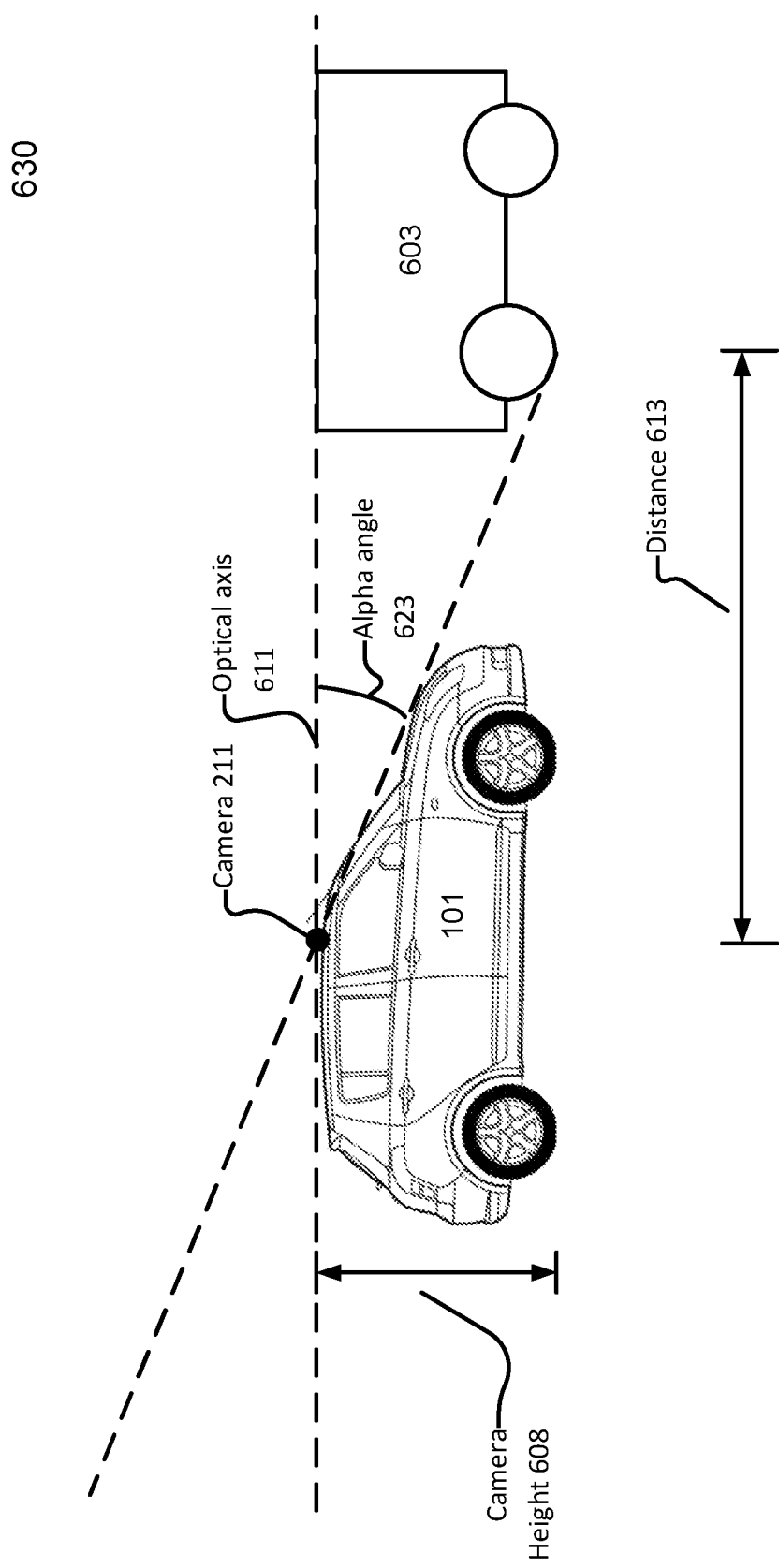
FIGS. 6B and 6C are block diagrams illustrating examples of side views for an ADV without and with a pitch angle respectively according to one embodiment.
Figure 6C:
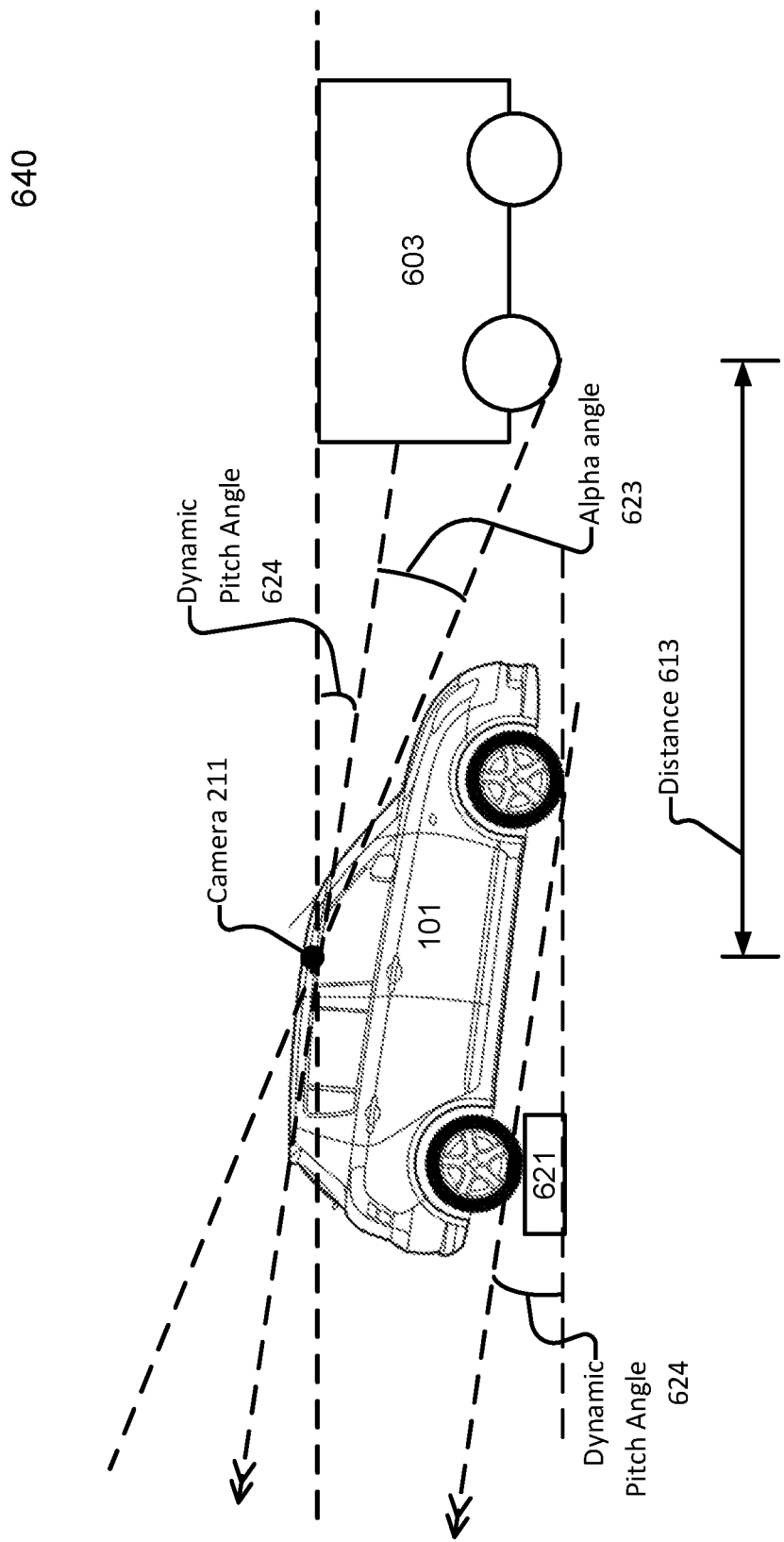

FIGS. 6B-6C are block diagrams illustrating examples of side views for an ADV without and with a pitch angle respectively according to one embodiment. Example 630 of FIG. 6B is similar to example 640 of FIG. 6C except dynamic pitch angle 624 is introduced by riser 621 in FIG. 6C. Example 630 of FIG. 6B can correspond to perspective view 600 of FIG. 6A. Referring to FIG. 6C, riser 621 can correspond to any instantaneous sources to cause a dynamic pitch angle such as an acceleration or braking of the ADV. Referring to FIG. 6C, the distance from the ADV to vehicle 603 can be calculated based on the algorithm: Dist=height/tan(alpha+beta), where Dist is the calculated distance from the ADV to vehicle 603, alpha is a previous static extrinsic calibration angle (which can include a static portion of pitch angle) from a camera optical axis to the ground point of contact for vehicle 603 (e.g., alpha angle 623), beta is a dynamic pitch angle to be determined (e.g., dynamic pitch angle 624), and his an estimated height of camera 211 from the ground plane. In this case, a real-time pitch angle calibration can be performed online while ADV 101 is in operation based on previous static camera extrinsic calibration parameters, e.g., alpha angle. For example, for a known alpha angle, distance calculation module 405 can calculate a distance value based on an initial dynamic pitch angle (such as 0.5 degrees). From the initial calculated distance and a true distance (e.g., distance 613) obtained by other methods such as a SONAR, LIDAR, and/or RADAR range measurement, pitch angle search module 407 can apply a search algorithm (such as a greedy search, a binary search, or any other search algorithm) to search for a dynamic pitch angle that best matches the calculated distance to the true distance. The dynamic pitch angle can then be determined to be a dynamic pitch angle corresponding to a calculated distance that is within some predetermined threshold of the true distance. Note, a greedy algorithm is an algorithm that follows the problem solving heuristic (e.g., calculating a solution from some candidate selections to solve an objective function) of making the locally optimal choice at each stage with the hope of finding a global optimum. A binary search is a search algorithm that finds the position of a target value within a sorted array.

Once the pitch angle is calibrated online (or the dynamic pitch angle is determined for a particular camera image and/or frame), in one embodiment, the determined dynamic pitch angle can be incorporated into the static extrinsic calibration parameters (e.g., modifying the camera extrinsic calibration parameters) for camera 211. Thereafter, 3D distance for all other ground pixel points, such as lane markings, free space boundaries and/or other detected 2D bounding boxes (based on their ground contact points), can be determined using the online per-frame extrinsic calibration parameters. In another embodiment, the determined dynamic pitch angle can be incorporated into a transformation matrix for converting pixels of captured images in an image plane to real-world coordinates. For example, the dynamic pitch angle can be incorporated into a matrix such as: $w[x\ y\ 1]=[X\ Y\ Z\ 1]\ [R\ t]^T K$, where w is a scale factor, [x y 1] is x and y axis of an image point corresponding to a pixel in an image plane, [X Y Z 1] corresponds to a real-world coordinate X, Y, and Z axis, $R=[yaw, static pitch angle+dynamic pitch angle, roll angle]^T$, t is a translation, and K is an intrinsic calibration matrix. The example matrix can then be used to adjust ground plane pixels for an image to perceive distances for any pixels for the image, such as markings on the road. The perceived distances can then be used by prediction module 303, decision module 304, and/or planning module 305 to generate a driving trajectory to control ADV 101.

Figure 7A:
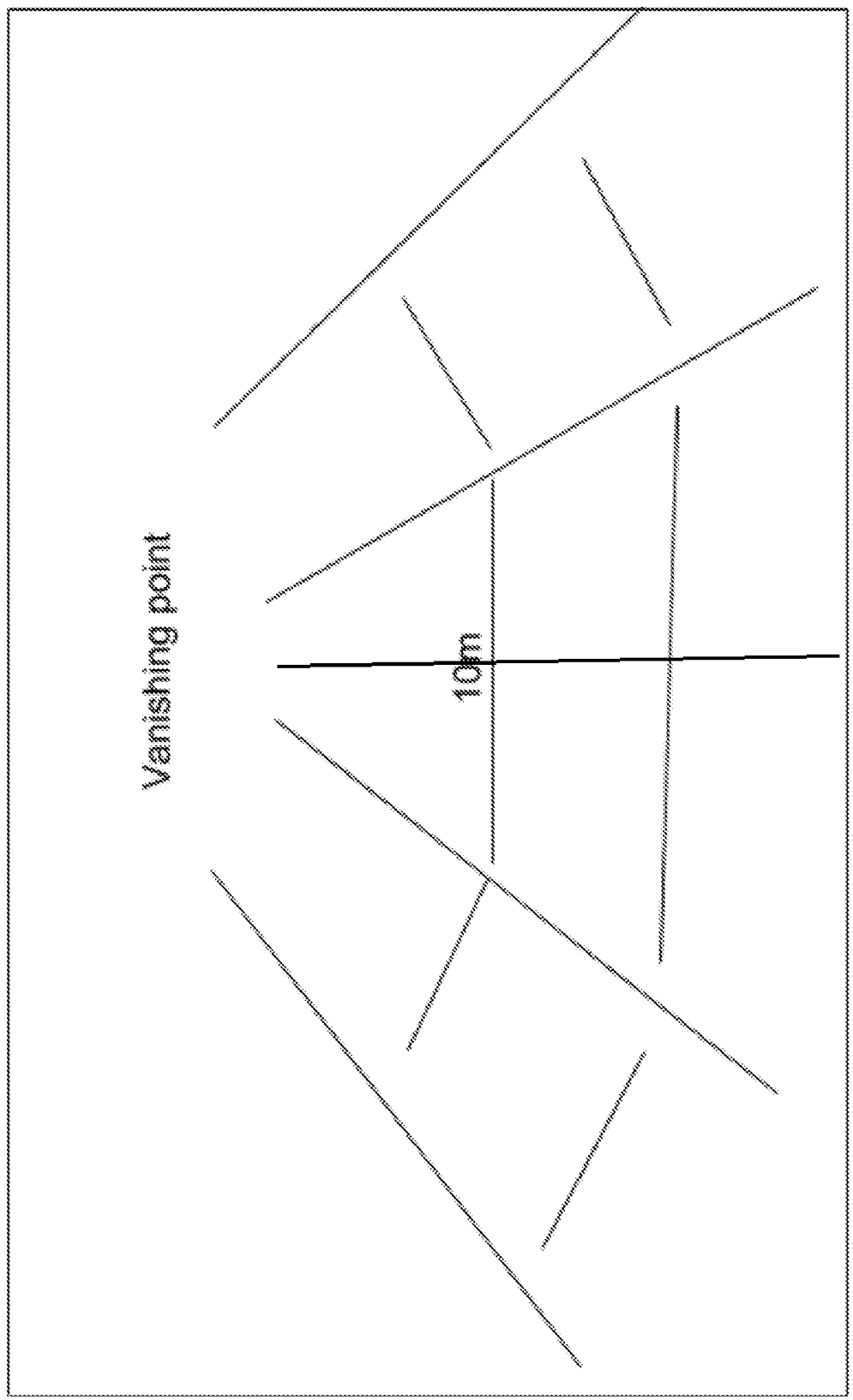
FIGS. 7A-7B are block diagrams showing two example perspective views for two different pitch angles.
Figure 7B:
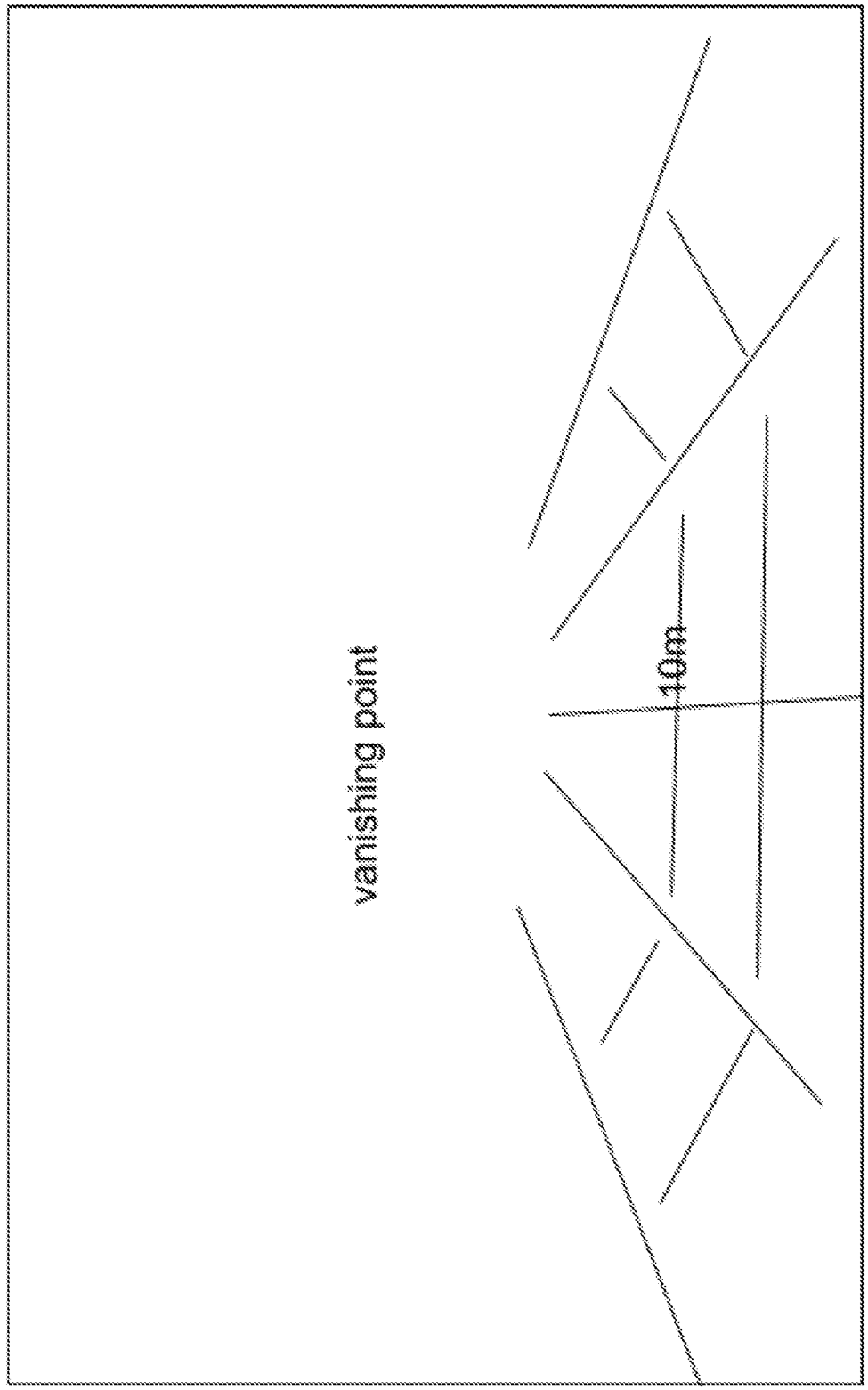

FIGS. 7A-7B are block diagrams showing two example perspective views for two different pitch angles. Referring to FIGS. 7A-7B, once a pitch angle is known, a perspective view from a captured image can be generated and/or adjusted using a transformation matrix having at least the camera extrinsic calibration parameters. Once the perspective views are adjusted, distances for each pixel on a ground plane can be determined. Here, the lines illustrated in FIGS. 7A-7B can represent a grid for different 2D coordinate values, e.g., (x, y) values, on a respective ground plane.

Figure 8:
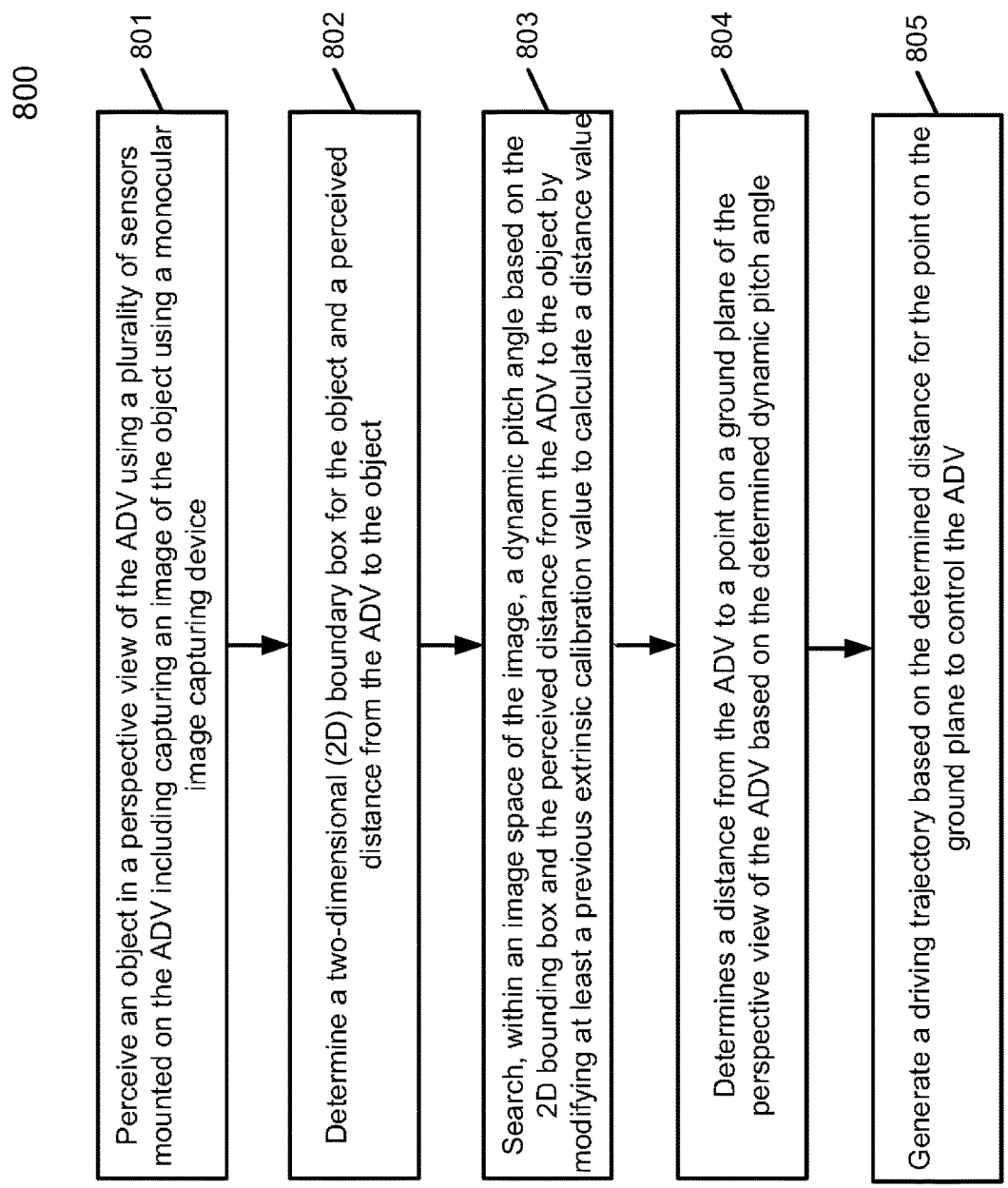
FIG. 8 is a flow diagram illustrating a method performed by an ADV according to one embodiment.

FIG. 8 is a flow diagram illustrating a method performed by an ADV according to one embodiment. Processing 800 may be performed by processing logic which may include software, hardware, or a combination thereof. For example, process 800 may be performed by pitch angle calibration module 308 of FIG. 3A. Referring to FIG. 8, at block 801, processing logic perceives an object in a perspective view of the ADV using a plurality of sensors mounted on the ADV including capturing an image of the object using a monocular image capturing device. At block 802, processing logic determines a two-dimensional (2D) bounding box for the object and a perceived distance from the ADV to the object based on the image of the object. At block 803, processing logic searches, within an image space of the image of the object, a dynamic pitch angle based on the 2D bounding box and the perceived distance from the ADV to the object by modifying at least a previous extrinsic calibration value to calculate a distance value. At block 804, processing logic determines a distance from the ADV to a point on a ground plane of the perspective view of the ADV based on the determined dynamic pitch angle. At block 805, processing logic generates a driving trajectory based on the determined distance for the point on the ground plane to control the ADV.

In one embodiment, modifying at least a previous extrinsic calibration value includes modifying a dynamic pitch angle associated with a previous extrinsic calibration value for the monocular image capturing device. In one embodiment, the 2D bounding box for the object is determined by applying a machine learning algorithm model to the image capturing the object in the perspective view, and determining a dimension of the 2D bounding box bounding the object based on the machine learning algorithm model. In one embodiment, processing logic further determines a ground point of contact of the 2D bounding box to calculate a distance from the ADV to the object based on the ground point of contact for the 2D bounding box.

In one embodiment, searching for the dynamic pitch angle includes calculating the distance from the ADV to the object based on $D=h/\tan(alpha+beta)$, where beta is the dynamic pitch angle to be calculated, D is the calculated distance, alpha is a previous calibration angle from a camera optical axis to the ground, and h is an estimated height of the object. In one embodiment, the dynamic pitch angle is searched using a binary search algorithm until the calculated distance from the ADV to the object is within a second predetermined threshold of the perceived distance from the ADV to the object. In one embodiment, the dynamic pitch angle is searched using a greedy search algorithm until the calculated distance from the ADV to the object is within a second predetermined threshold of the perceived distance from the ADV to the object.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
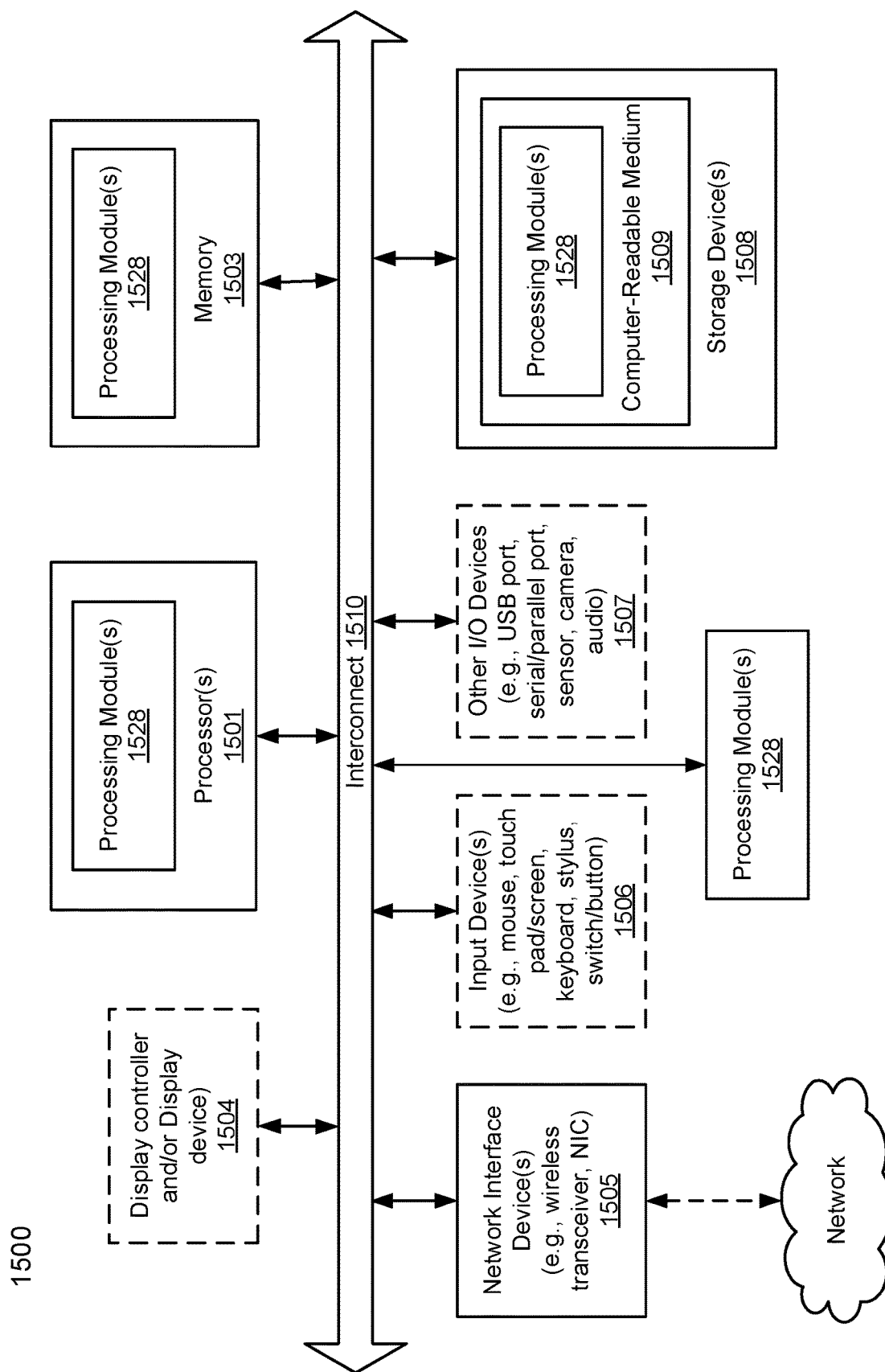
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110, or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, pitch angle calibration module 308 of FIG. 3A. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    perceiving an object in a perspective view of the ADV using a plurality of sensors mounted on the ADV including capturing an image of the object using a monocular image capturing device;
    determining a two-dimensional (2D) bounding box for the object and a perceived distance from the ADV to the object based on the image of the object;
    searching, within an image space of the image of the object, for a dynamic pitch angle based on the 2D bounding box and the perceived distance from the ADV to the object by modifying at least a previous extrinsic calibration value to calculate a distance value;
    determining a distance from the ADV to a point on a ground plane of the perspective view of the ADV based on the determined dynamic pitch angle; and
    generating a driving trajectory based on the determined distance for the point on the ground plane to control the ADV.

2. The computer-implemented method of claim 1, wherein modifying at least a previous extrinsic calibration value includes modifying a pitch angle associated with a previous extrinsic calibration value for the monocular image capturing device.

3. The computer-implemented method of claim 1, wherein the 2D bounding box for the object is determined by:
    applying a machine learning algorithm model to the image capturing the object in the perspective view; and
    determining a dimension of the 2D bounding box bounding the object based on the machine learning algorithm model.

4. The computer-implemented method of claim 1, further comprises determining a ground point of contact of the 2D bounding box to calculate a distance from the ADV to the object based on the ground point of contact for the 2D bounding box.

5. The computer-implemented method of claim 1, wherein searching for the dynamic pitch angle comprises calculating the distance from the ADV to the object based on formula D=h/tan(alpha+beta), where beta is the dynamic pitch angle to be calculated, D is the calculated distance, alpha is a previous calibration angle from a camera optical axis to the ground, and h is an estimated height of the object.

6. The computer-implemented method of claim 1, wherein the dynamic pitch angle is searched using a binary search algorithm until the calculated distance from the ADV to the object is within a second predetermined threshold of the perceived distance from the ADV to the object.

7. The computer-implemented method of claim 1, wherein the dynamic pitch angle is searched using a greedy search algorithm until the calculated distance from the ADV to the object is within a second predetermined threshold of the perceived distance from the ADV to the object.

8. A non-transitory machine-readable medium having instructions stored therein, which when executed by one or more processors, cause the one or more processors to perform operations, the operations comprising:
   perceiving an object in a perspective view of the ADV using a plurality of sensors mounted on the ADV including capturing an image of the object using a monocular image capturing device;
   determining a two-dimensional (2D) bounding box for the object and a perceived distance from the ADV to the object based on the image of the object;
   searching, within an image space of the image of the object, for a dynamic pitch angle based on the 2D bounding box and the perceived distance from the ADV to the object by modifying at least a previous extrinsic calibration value to calculate a distance value;
   determining a distance from the ADV to a point on a ground plane of the perspective view of the ADV based on the determined dynamic pitch angle; and
   generating a driving trajectory based on the determined distance for the point on the ground plane to control the ADV.

9. The non-transitory machine-readable medium of claim 8, wherein modifying at least a previous extrinsic calibration value includes modifying a pitch angle associated with a previous extrinsic calibration value for the monocular image capturing device.

10. The non-transitory machine-readable medium of claim 8, wherein the 2D bounding box for the object is determined by:
    applying a machine learning algorithm model to the image capturing the object in the perspective view; and
    determining a dimension of the 2D bounding box bounding the object based on the machine learning algorithm model.

11. The non-transitory machine-readable medium of claim 8, further comprises determining a ground point of contact of the 2D bounding box to calculate a distance from the ADV to the object based on the ground point of contact for the 2D bounding box.

12. The non-transitory machine-readable medium of claim 8, wherein searching for the dynamic pitch angle comprises calculating the distance from the ADV to the object based on formula D=h/tan(alpha+beta), where beta is the dynamic pitch angle to be calculated, D is the calculated distance, alpha is a previous calibration angle from a camera optical axis to the ground, and h is an estimated height of the object.

13. The non-transitory machine-readable medium of claim 8, wherein the dynamic pitch angle is searched using a binary search algorithm until the calculated distance from the ADV to the object is within a second predetermined threshold of the perceived distance from the ADV to the object.

14. The non-transitory machine-readable medium of claim 8, wherein the dynamic pitch angle is searched using a greedy search algorithm until the calculated distance from the ADV to the object is within a second predetermined threshold of the perceived distance from the ADV to the object.

15. A data processing system, comprising:
    one or more processors; and
    a memory coupled to the one or more processors to store instructions, which when executed by the one or more processors, cause the one or more processors to perform operations, the operations including
      perceiving an object in a perspective view of the ADV using a plurality of sensors mounted on the ADV including capturing an image of the object using a monocular image capturing device;
      determining a two-dimensional (2D) bounding box for the object and a perceived distance from the ADV to the object based on the image of the object;
      searching, within an image space of the image of the object, for a dynamic pitch angle based on the 2D bounding box and the perceived distance from the ADV to the object by modifying at least a previous extrinsic calibration value to calculate a distance value;
      determining a distance from the ADV to a point on a ground plane of the perspective view of the ADV based on the determined dynamic pitch angle; and
      generating a driving trajectory based on the determined distance for the point on the ground plane to control the ADV.

16. The system of claim 15, wherein modifying at least a previous extrinsic calibration value includes modifying a pitch angle associated with a previous extrinsic calibration value for the monocular image capturing device.

17. The system of claim 15, wherein the 2D bounding box for the object is determined by:
    applying a machine learning algorithm model to the image capturing the object in the perspective view; and
    determining a dimension of the 2D bounding box bounding the object based on the machine learning algorithm model.

18. The system of claim 15, further comprises determining a ground point of contact of the 2D bounding box to calculate a distance from the ADV to the object based on the ground point of contact for the 2D bounding box.

19. The system of claim 15, wherein searching for the dynamic pitch angle comprises calculating the distance from the ADV to the object based on formula D=h/tan(alpha+beta), where beta is the dynamic pitch angle to be calculated, D is the perceived distance, alpha is a previous calibration angle from a camera optical axis to the ground, and h is an estimated height of the object.

20. The system of claim 15, wherein the dynamic pitch angle is searched using a binary search algorithm until the calculated distance from the ADV to the object is within a second predetermined threshold of the perceived distance from the ADV to the object.

21. The system of claim 15, wherein the dynamic pitch angle is searched using a greedy search algorithm until the calculated distance from the ADV to the object is within a second predetermined threshold of the perceived distance from the ADV to the object.

* * * * *